US 7,642,934 B2

(12) United States Patent
Scott (10) Patent No.: US 7,642,934 B2
(45) Date of Patent: Jan. 5, 2010

(54) METHOD OF MAPPING A TRADITIONAL TOUCHTONE KEYPAD ON A HANDHELD ELECTRONIC DEVICE AND ASSOCIATED APPARATUS

(75) Inventor: Sherryl Lee Lorraine Scott, Toronto (CA)

(73) Assignee: Research In Motion Limited, Ontario (CA)

( * ) Notice: Subject to any disclaimer, the term of this patent is extended or adjusted under 35 U.S.C. 154(b) by 595 days.

(21) Appl. No.: 11/558,621

(22) Filed: Nov. 10, 2006

(65) Prior Publication Data

US 2008/0111711 A1    May 15, 2008

(51) Int. Cl.
*H03M 11/00* (2006.01)
(52) U.S. Cl. ............... 341/23; 379/355.07; 379/433.07; 379/433.04; 382/229; 715/811; 345/168
(58) Field of Classification Search ................... 341/20, 341/23; 379/335.07, 433.07, 433.04; 382/229; 715/811; 345/168
See application file for complete search history.

(56) References Cited

U.S. PATENT DOCUMENTS

| 6,643,371 | B2 * | 11/2003 | Mager | ................... 379/355.07 |
| 7,020,270 | B1 | 3/2006 | Ghassabian | |
| 7,084,858 | B2 * | 8/2006 | Anson | ....................... 345/169 |
| 2004/0169635 | A1 | 9/2004 | Ghassabian | |
| 2005/0253814 | A1 | 11/2005 | Ghassabian | |
| 2007/0079239 | A1 | 4/2007 | Ghassabian | |
| 2007/0182595 | A1 | 8/2007 | Ghasabian | |
| 2007/0188472 | A1 | 8/2007 | Ghassabian | |
| 2007/0279256 | A1 * | 12/2007 | Salman et al. | ................. 341/23 |

FOREIGN PATENT DOCUMENTS

| EP | 0 712 066 A | 5/1996 |
| GB | 2 131 746 A | 6/1984 |
| JP | 58-003020 A | 1/1983 |
| WO | 98/33111 A1 | 7/1998 |
| WO | 2004/111798 A2 | 12/2004 |
| WO | 2005/122401 A2 | 12/2005 |
| WO | 2006/080935 A1 | 8/2006 |

OTHER PUBLICATIONS

IBM, "Button Interface with Visual Cues," IBM Technical Disclosure, vol. 28, No. 6, pp. 2648-2649, New York, NY (Nov. 1985) (XP-002066525).
Anonymous, "Entering an Alphabetic Phone Number on a Mobile Device Keyboard," Internet Document, Oct. 25, 2005, retrieved from the Internet: URL:http://www.priorartdatabase.com/IPCOM/000130511/.
Palm, "Using Your Treo 700p Smartphone," Palm, Inc. (2006) pp. 36-46.

* cited by examiner

*Primary Examiner*—Albert K Wong
(74) *Attorney, Agent, or Firm*—David C. Jenkins, Esq.; Brij K. Agarwal, Esq.; Eckert Seamans Cherin & Mellott, LLC (57) ABSTRACT

A method of mapping a traditional touchtone telephone keypad on a handheld electronic device having a disambiguation function, and an associated apparatus comprises outputting a representation of a remapped character layout and generating a disambiguated interpretation of an input.

20 Claims, 4 Drawing Sheets

METHOD OF MAPPING A TRADITIONAL TOUCHTONE KEYPAD ON A HANDHELD ELECTRONIC DEVICE AND ASSOCIATED APPARATUS

BACKGROUND

1. Field

The disclosed and claimed concept relates generally to handheld electronic devices that employ a text disambiguation function and, more particularly, to an improved method of enabling input on a handheld electronic device having a disambiguation function.

2. Description of the Related Art

Numerous types of handheld electronic devices are known. Examples of such handheld devices include, for instance, personal data assistants (PDAs), handheld computers, two-way pagers, cellular telephones, and the like. Many handheld electronic devices also feature wireless communication capability, although many such handheld devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable.

Figure 1:
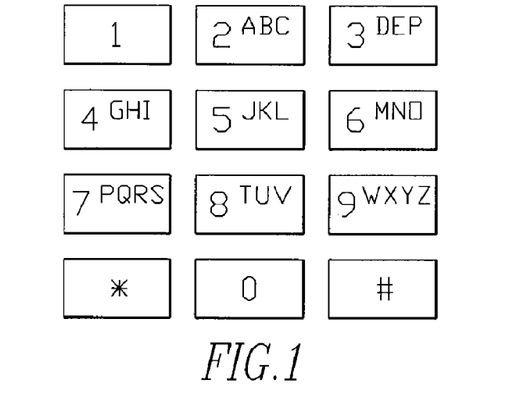
FIG. 1 is a top plan view of a traditional touch tone keypad.
Figure 2:
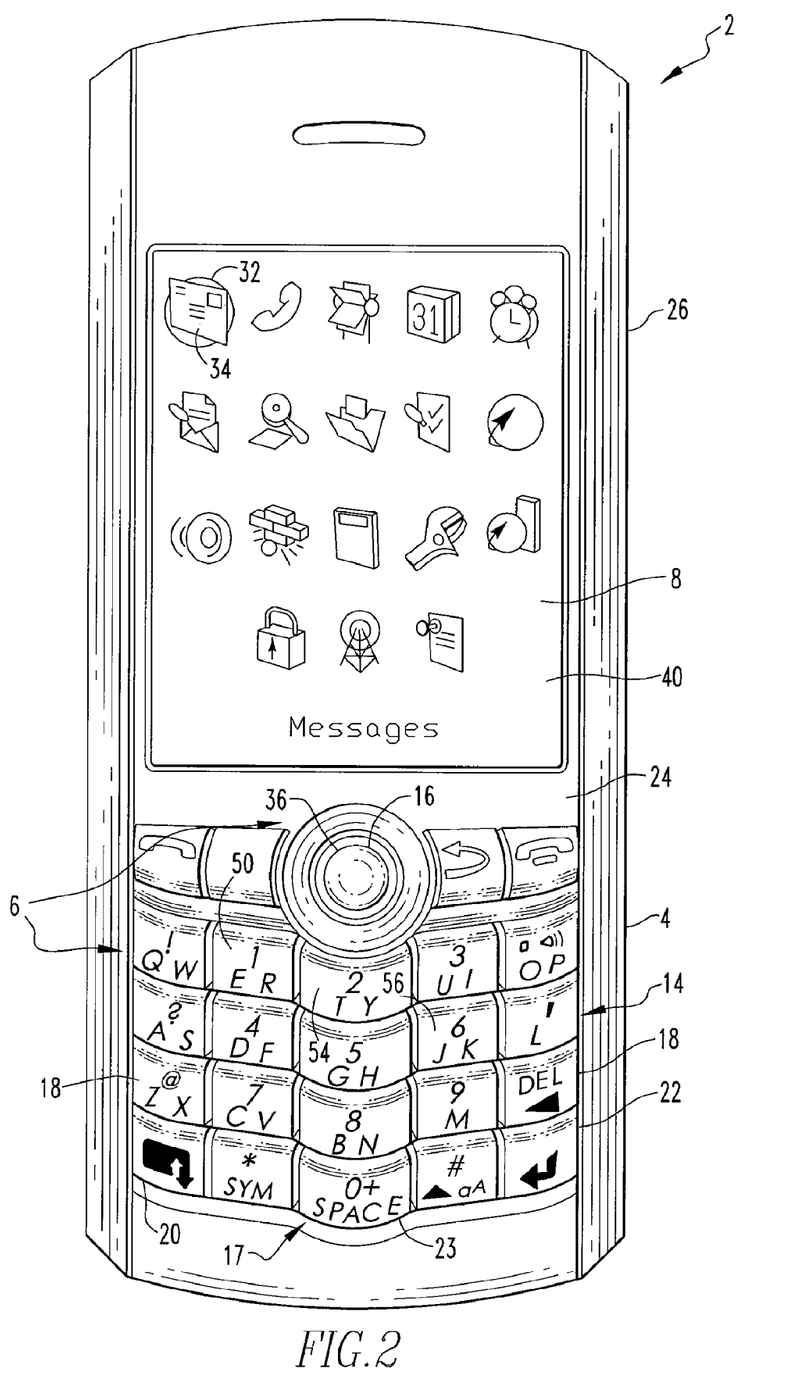
FIG. 2 is a top plan view of an embodiment of the improved handheld electronic device in accordance with the disclosed and claimed concept.

One way of providing numerous letters in a small space has been to provide a "reduced keyboard" in which multiple letters, symbols, and/or digits, and the like, are assigned to any given key. For example, a traditional touchtone telephone (FIG. 1) includes a reduced keypad which comprises twelve keys, of which ten have digits thereon, and of these ten keys, eight have letters assigned thereto. For instance, one of the keys includes the digit "2" as well as the letters "A", "B", and "C". Other "reduced keyboards", however, can be based on a QWERTY keyboard layout (FIG. 2). Accordingly, unlike the traditional touch-tone telephone keypad, in an exemplary reduced QWERTY keypad the key that is assigned the digit "2" may be assigned the letters "T" and "Y" as opposed to "A", "B", and "C".

Despite the numerous advantages that a reduced QWERTY keypad provides over a traditional touch-tone telephone keypad, the reduced QWERTY keypad does have one shortcoming. This shortcoming relates to a given key's letter assignment, specifically, the letter assignment given to the keys associated with a digit (digit keys). For example, when a user calls an automated company directory using a touchtone telephone, the automated telephone system will typically ask the user to spell the name of the individual that the user would like to speak to by using the letters that are found on the traditional touchtone telephone keypad. Accordingly, if the user wanted to speak to an individual named "ALLIE", the user would dial "25543" as the key sequence since on the traditional touchtone telephone keypad "25543" is the key sequence that spells the name "ALLIE" (see FIG. 1). The automated company directory would then recognize the Dual Tone Multi-Frequency signal (hereinafter, referred to as DTMF signal(s)) that is associated with the key sequence "25543" and would automatically connect the user to the dialed party. As stated above, however, the letters associated with the digit keys on a reduced QWERTY keypad do not correspond to the letters that are found on a traditional touch-tone telephone keypad. In other words, the key sequence "25543" on a reduced QWERTY keypad does not spell the name "ALLIE". Therefore, the user would be unable to use the letters that are printed on the keys of a reduced QWERTY keypad to enter the desired name into the automated company directory.

BRIEF DESCRIPTION OF THE DRAWINGS

A full understanding of the disclosed and claimed concept can be gained from the following description when read in conjunction with the accompanying drawings in which:

DESCRIPTION

As used herein, the phrase "a number of" or variations thereof means one or an integer greater than one.

As used herein, the phrase "digit" or variations thereof shall broadly refer to the digits 1, 2, 3, 4, 5, 6, 7, 8, 9, and 0.

As used herein, the phrase "letters" or variations thereof shall broadly refer to a component of an alphabet or a symbol/character that represents a speech sound. By way of example and not limitation, the letter can be a Latin letter.

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

One embodiment of a handheld electronic device 2 in accordance with the disclosed and claimed concept is depicted generally in FIG. 2. The handheld electronic device 2 of FIG. 2 is depicted schematically in FIG. 3. The handheld electronic device 2 includes a housing 4 upon which are disposed a processor unit that includes an input apparatus 6, an output apparatus 8, a processor 10, a memory 12, and a wireless transceiver 13. The processor 10 may be, for instance, and without limitation, a microprocessor (μP) and is responsive to inputs from the input apparatus 6 and provides output signals to the output apparatus 8. The processor 10 also interfaces with the memory 12 which, as will be discussed in greater detail below, contains one or more routines that are used to implement the disclosed and claimed concept. The processor 10 and the memory 12 together form a processor apparatus.

Referring to FIG. 2, the input apparatus 6 includes a keypad 14 and a navigational input member 16. The keypad 14 is in the exemplary form of a reduced QWERTY keyboard including a plurality of keys 18 that serve as input members. Many of the keys 18 each have a plurality of characters assigned thereto. Moreover, the keypad 14 also includes a subset 17 wherein each key 18 in the subset 17 is assigned a digit. The keypad 14 also includes an <ALT> key 20, an <ENTER> key 22, and a <SPACE> key 23. It is noted, however, that the keypad 14 may be of other configurations, such as an AZERTY keyboard, a QWERTY keyboard, a QWERTZ keyboard or another keyboard arrangement, whether or not reduced, and whether presently known or unknown.

The keys 18 are located on a front face 24 of the housing 4, and the navigational input member 16, which is in the exemplary form a trackball 36, is disposed on the front face 24 of the housing 4 as well. The trackball 36 is rotatable in various directions thereby allowing for the navigation of the cursor 32, which is displayed on the output apparatus 8, in various directions including up, down, left, right, and any combination thereof. Moreover, the trackball 36 can also be depressed to provide a selection or other input based upon the current location of the cursor 32. Accordingly, rotation of the trackball 36 can navigate the cursor 32 over a particular program icon 34, while depression of the trackball 36 can launch the program. It should be noted that a trackwheel (not shown), which can be disposed on a side 26 of the housing 4, can be used in lieu of the trackball 36. Similar to the trackball, the trackwheel can serve as input member since the trackwheel is capable of being rotated in a clockwise or a counterclockwise direction as well as being depressed. Rotation of the trackwheel can provide a navigation or other input, while depression of the trackwheel can provide a selection or other input. For example, if a cursor 32 is located over a given program icon 34, that program will be launched when the trackwheel is depressed.

Figure 3:
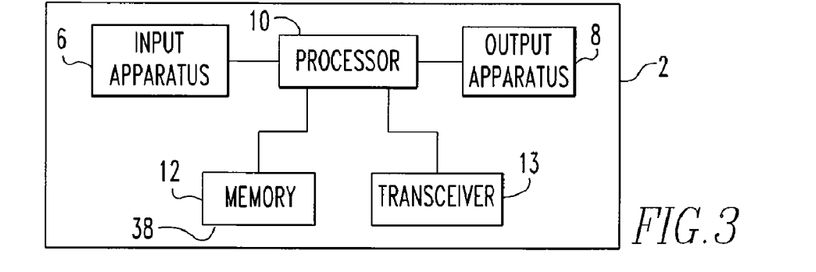
FIG. 3 is a schematic depiction of the handheld electronic device of FIG. 2.

Referring to FIG. 3, the memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10. The memory 12 additionally can include one or more routines depicted generally with the numeral 38 for the processing of data. The routines 38 can be in any of a variety of forms such as, without limitation, software, firmware, and the like.

As stated above, a shortcoming of a reduced QWERTY keypad is that a user would not be able to use the letters associated with the digit keys of the reduced QWERTY keypad to assist in entering information, such as a name or a password, into an automated telephone system since the letters associated with the digit keys on the reduced QWERTY keypad do not correspond to the letters that are typically found on the alphanumeric keys of a traditional touchtone telephone keypad.

The handheld electronic device 2 overcomes this shortcoming by having a routine 38 that is adapted to display a representation of a traditional touchtone telephone keypad on the display 40 of the output apparatus 8 upon detecting a predetermined input. The routine 38 is also adapted to alter the character assignments of the digit keys in the subset 17 of the handheld electronic device 2 to correspond with the character assignments of the digit keys of the traditional touchtone telephone keypad which is being displayed on the output apparatus 8 of the handheld electronic device 2. Moreover, the routine 38 is further advantageously adapted to disambiguate an ambiguous input, which is based on inputs derived from the digit keys with altered character assignments, in order to provide the user with a visual representation of the name or word that he/she dialed into the handheld electronic device 2, thereby serving as visual confirmation that the correct name or word was dialed.

Figure 4:
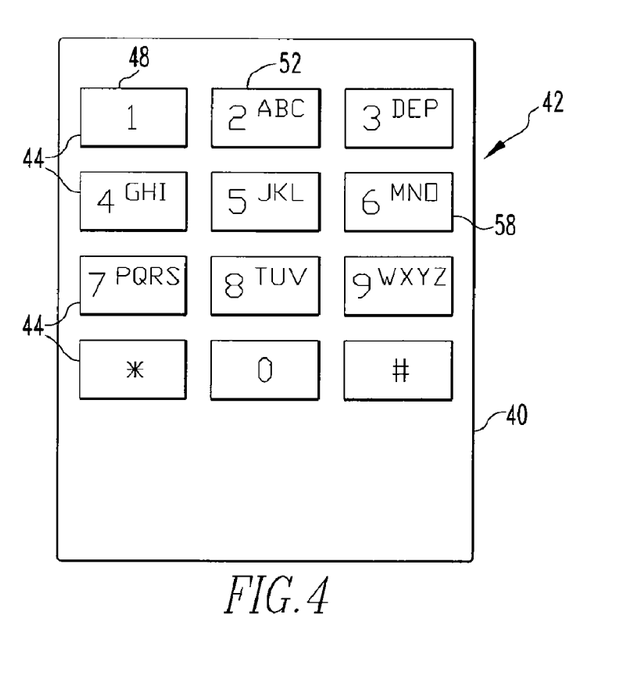
FIG. 4 depicts an output that can be generated on the improved handheld electronic device of FIG. 2.
Figure 4A:
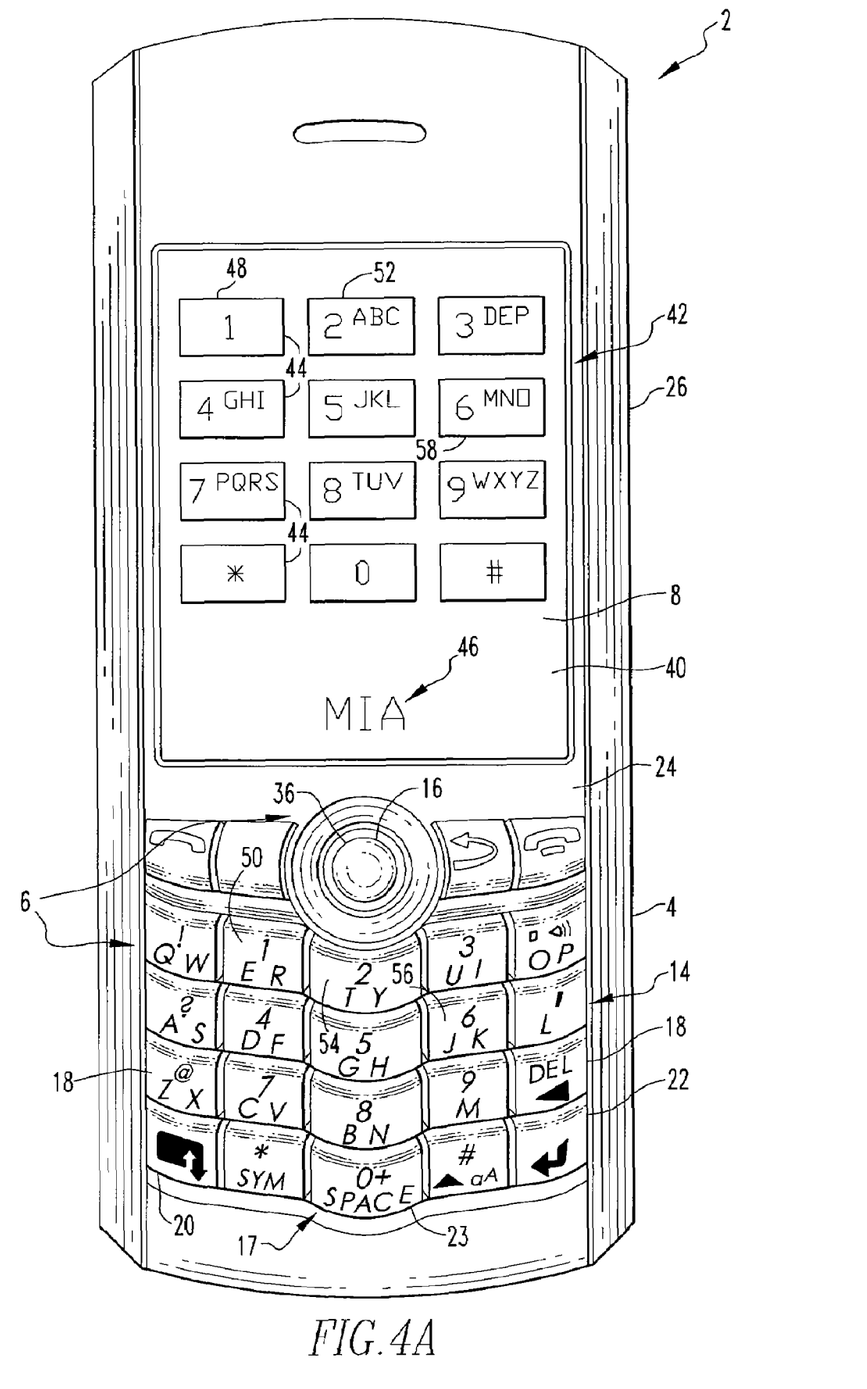
FIG. 4A is a top plan view of the improved handheld electronic device of FIG. 2 with the output of FIG. 4.

Referring to FIGS. 4 and 4A, as stated above, the handheld electronic device 2 will output on the display 40 of the output apparatus 8 a representation of a traditional touchtone telephone keypad 42 (hereinafter, referred to as the representation) upon detecting a predetermined input. For example, the predetermined input can be an input, such as a number of input member actuations or a vocal command, which initiates a telephone routine. As can be seen from these figures, the representation 42 comprises twelve keys 44 of which ten are associated with a digit. Of the ten digit keys 44 in the representation 42, eight keys 44 are also associated with letters. Each key 44 in the representation 42 has a spatial position that corresponds to a spatial position of a key 18 located in the subset 17. For example, the key 48 in the representation 42 that is assigned the digit "1" corresponds to the key 50 in the subset 17 that is assigned the digit "1" while the key 52 in the representation 42 that is assigned the digit "2" corresponds to the key 54 in the subset 17 that is assigned the digit "2".

As stated above, upon detecting the predetermined input, the handheld electronic device 2 will not only output the representation of the traditional touchtone telephone keypad 42 on the display 40 of the output apparatus 8, but the handheld electronic device 2 will also alter the character assignments of the digit keys in the subset 17 to correspond with their respective counterpart keys 44 in the representation 42. For instance, the key 54 in the subset 17 that is assigned the digit "2" and the letters "T" and "Y" will have its character assignment altered such that the key 54 in the subset 17 will be temporarily assigned the letters "A", "B", and "C" (as opposed to the letters "T" and "Y") which is the letter assignment of the key 52 in the representation 42 to which the key 54 in the subset 17 spatially corresponds. When the user actuates this key 54, not only will the handheld electronic device 2 output the DTMF signal that is normally associated with the digit "2" on a traditional touch tone telephone keypad, but the handheld electronic device 2 will also detect an ambiguous input that can either be the letter "A", "B", or "C". Additionally, the key 50 in the subset 17 that is assigned the digit "1" and the letters "Q" and "W" will have its character assignment altered such that the key 50 in the subset 17 will temporarily be assigned only the digit "1" since the corresponding key 48 in the representation 42 does not have any letters assigned thereto.

Therefore, if the user of the handheld electronic device 2 needed to dial the key sequence that corresponds with the name "MIA" into an automated telephone system, the user would first enter the predetermined input which would initiate the telephone routine which would, in turn, would initiate the display of the representation of the traditional touch-tone telephone keypad 42 on the output apparatus 8 of the handheld electronic device 2. Once the representation 42 is output on the output apparatus 8, the user could reference the representation 42 in order to dial the required key sequence, which is "642", on the keypad 14 of the handheld electronic device 2 by actuating the keys 18 in the subset 17.

As stated above, however, the handheld electronic device 2 not only outputs the representation 42 on the output apparatus 8, but it also alters the character assignments of the digit keys in the subset 17 to correspond with their respective spatial counterpart keys 44 in the representation 42. The disambiguation routine will then employ the altered character assignments of the actuated keys 44 so that a visual output of the name or word in a dictionary on the handheld electronic device 2 that corresponds with the dialed input will appear on the output apparatus 8 as well. In other words, actuation of the key 56 in the subset 17 that is assigned the digit "6" does not result in an input that could either be the letter "J" or "K", but rather the possible input could be the letter "M", "N", or "O" since the key 58 in the representation 42 to which the key 56 in the subset 17 spatially corresponds has these letters assigned thereto. Accordingly, the handheld electronic device 2 will use its disambiguation function to disambiguate the ambiguous inputs that result from the key sequence "642", and the handheld electronic device 2 will output the name "MIA" in the text component 46 of the output apparatus 8 (see FIG. 4A). The user would, therefore, know that he/she dialed the correct key sequence into the handheld electronic device 2.

In another embodiment of the disclosed concept, the handheld electronic device 2 could not only output the name or word that was dialed by the user, but the handheld electronic device 2 would also output the digits that were dialed as well. For example, beneath the name "MIA" the handheld electronic device 2 could output the digits "642".

In yet another embodiment, the user can also output a digit in the text component 46 of the output apparatus 8 by actuating the <ALT> key 20 along with a digit key. For example, if the user wanted a visual confirmation of "1800ALLIE", the user would first press-and-hold the <ALT> key 20 while actuating the keys 18 on the handheld electronic device that correspond to the digits "1800". The user would then release the <ALT> key 20 and would enter the key sequence, "25543", which corresponds to the name "ALLIE". Accordingly, the handheld electronic device 2 would output "1800ALLIE" in the text component 46 of the output apparatus 8.

In yet another embodiment, the user could also dial the required key sequence by merely reciting (i.e., speaking), the numbers "642" into the handheld electronic device 2. When the handheld electronic device 2 detects the user reciting a particular digit, such as the digit "6", the handheld electronic device 2 will not only output the DTMF signal that is associated with the recited digit, but the handheld electronic device 2 will also disambiguate an ambiguous input that comprises the letters that correspond to the recited digit. For example, if the user recites the digit "6" when the representation 42 is being displayed on the output apparatus 8, the handheld electronic device 2 will output the DTMF signal that corresponds with the digit "6", as well as disambiguate a possible input that can either be the letter "M", "N", or "O". As stated above, the handheld electronic device 2 will then generate a visual output of the name or word that was recited.

Figure 5:
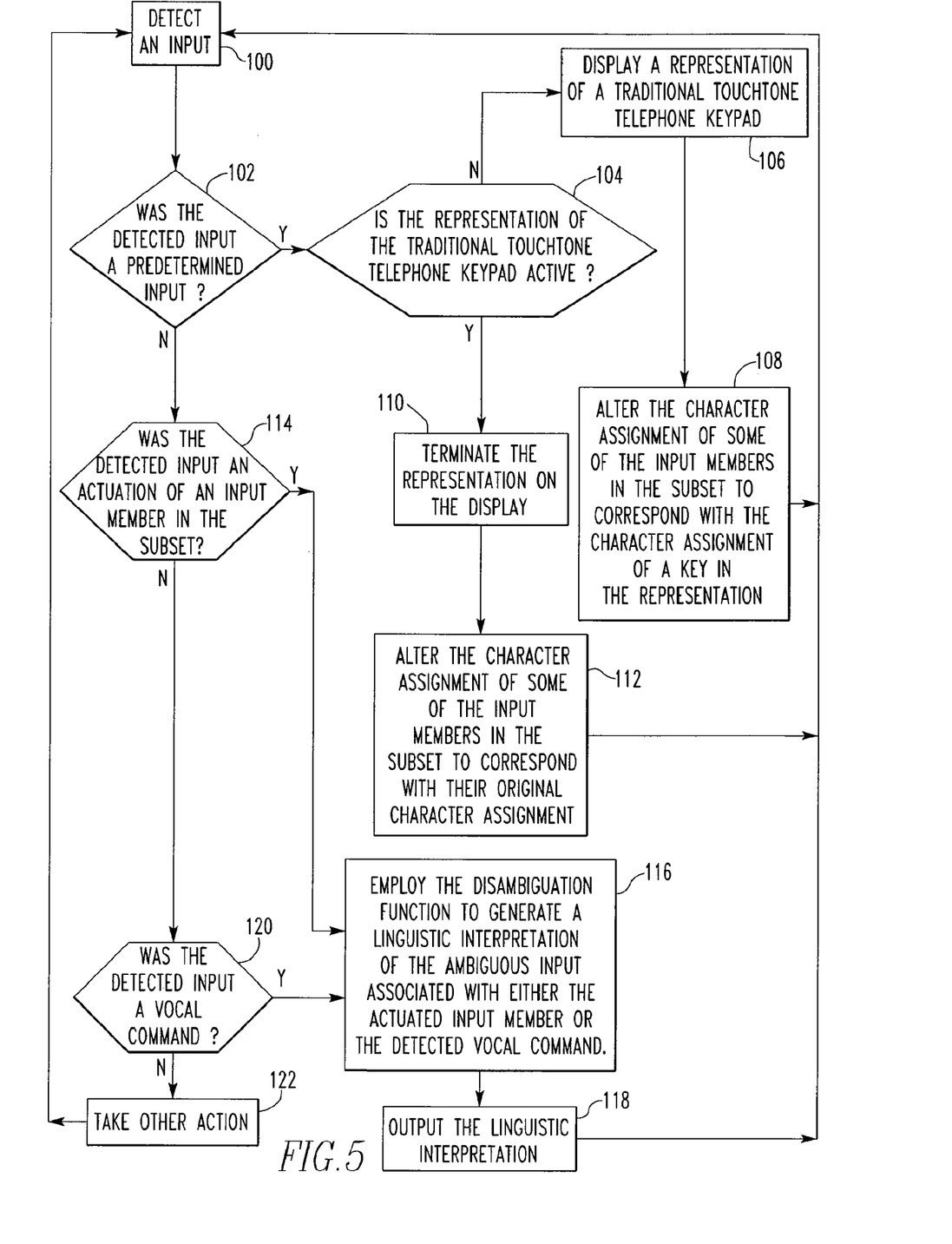
FIG. 5 depicts another output that can be generated on the improved handheld electronic device of FIG. 2.

FIG. 5 is a flowchart depicting one embodiment of the disclosed concept. As can be seen from this figure, the handheld electronic device 2 will detect an input at step 100. The handheld electronic device 2 will then determine whether the detected input was a predetermined input at step 102. If the handheld electronic device 2 does determine that the detected input was a predetermined input, then the handheld electronic device 2 will determine whether a representation of the traditional touchtone telephone keypad 42 is currently being displayed on the output apparatus 8 at step 104. If the handheld electronic device 2 determines that a representation 42 is not currently being displayed, then the handheld electronic device 2 will display a representation of a traditional touch tone telephone keypad 42 on the output apparatus 8 of the handheld electronic device 2 at step 106. Additionally, the handheld electronic device 2 will, at step 108, alter the character assignment (first character assignment) of at least some of the keys 18 in the subset 17 to correspond with the character assignment (second character assignment) of the keys 44 in the representation 42 which have the same spatial position. For example, as stated above, the key 54 in the subset 17 that is assigned the digit "2" and the letters "T" and "Y" will have its character assignment altered such that it will be temporarily have assigned thereto the letters "A", "B", and "C" (as opposed to the letters "T" and "Y") which is the letter assignment of the key 52 in the representation 42 to which the key 54 in the subset 17 spatially corresponds. After the character assignment of the keys 18 in the subset 17 have been altered, the handheld electronic device will return to step 100.

The handheld electronic device 2 will then detect another input at step 100. The handheld electronic device 2 will determine whether the detected input was a predetermined input at step 102. If the handheld electronic device 2 determines that the detected input was not a predetermined input, then the handheld electronic device 2 will determine whether the detected input was an actuation of a key 18 disposed in the subset 17 at step 114. If the handheld electronic device 2 does determine that the detected input was an actuation of a key 18 disposed in the subset 17, then the handheld electronic device 2 will employ its disambiguation function to generate a linguistic interpretation of the ambiguous inputs that are assigned to the actuated key 18 at step 116. In this regard, it is understood that if the current actuation of a key 18 is one of a series of key actuations, the disambiguation routine will seek a disambiguated interpretation of the entire series of key actuations. Moreover, the handheld electronic device 2 may be configured such that the disambiguated interpretation of a series of key actuations is limited to being a complete word, i.e., no disambiguated interpretation would be output unless it corresponds lengthwise to a complete word, as opposed to an initial portion of a word or a character string that does not constitute a word.

The handheld electronic device 2 will then output the linguistic interpretation on the output apparatus 8 at step 118. After the linguistic interpretation has been output, the handheld electronic device 2 will return to step 100.

Alternatively, if the handheld electronic device 2 determines, at step 114, that the detected input was not an actuation of a key 18 disposed in the subset 17, then the handheld electronic device 2 will determine whether the detected input was a vocal command at step 120. For example, the handheld electronic device 2 will determine whether the detected input was the user reciting the digit "6" into the handheld electronic device 2. If the handheld electronic device 2 does determine that the detected input was a vocal command, then the handheld electronic device 2 will employ its disambiguation function, at step 116, to generate a linguistic interpretation of the ambiguous inputs that are assigned to the digit that was recited, and will output the linguistic interpretation at step 118. The handheld electronic device 2 will then return to step 100 after the linguistic interpretation has been output.

If the handheld electronic device 2 determines that the detected input was not a vocal command, at step 120, then the handheld electronic device 2 will take some other actuation such as, without limitation, determining whether the detected input was a selection input at step 122 prior to returning to step 100.

If the handheld electronic device detects yet another input at step 100, the handheld electronic device 2 will determine whether the detected input was a predetermined input at step 102. If the handheld electronic device 2 does determine that the detected input was a predetermined input, then the handheld electronic device 2 will determine whether the representation of the traditional touchtone telephone keypad 42 is currently being displayed on the output apparatus 8. If the handheld electronic device 2 does determine that the representation 42 is currently being displayed, then the handheld electronic device 2 will terminate the representation 42 at step 110, and will alter the character assignment of the keys 18 in the subset 17 to correspond with their original character assignment at step 112. For example, the key 54 in the subset 17 that is assigned the digit "2" and temporarily assigned the letters "A", "B", and "C" will have its character assignment altered such that the key 54 will once again be assigned the letters "T" and "Y", which is the original character assignment for the key 54. Additionally, the key 50 in the subset 17 that is assigned the digit "1" and temporarily which had no letters assigned thereto will once again be assigned and the letters "Q" and "W".

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input on a handheld electronic device having a disambiguation routine, said handheld electronic device including an input apparatus, an output apparatus, and a memory, said input apparatus having a plurality of input members that are capable of being actuated, a subset of said plurality of input members each having a first character assignment comprising a first set of letters, said method comprising:
   detecting a predetermined first input;
   responsive to said detecting a predetermined first input, displaying a representation of a keypad comprising a plurality of keys wherein at least some of the keys each have a second character assignment comprising a second set of letters, at least some of said keys each having a spatial position that corresponds to a spatial position of an input member in said subset;
   altering said first character assignments of at least some of said input members of said subset to each correspond with said second character assignment of a key having a corresponding spatial position, wherein the second character assignment comprises a plurality of characters;
   subsequent to said altering, detecting a second ambiguous input;
   employing said disambiguation routine to generate a linguistic interpretation of said second input; and
   outputting said linguistic interpretation.

2. The method according to claim 1, further comprising generating as said representation a representation of a touchtone telephone keypad.

3. The method according to claim 1, further comprising detecting as said first input an input that initiates a telephone routine.

4. The method according to claim 1, further comprising detecting as said first input a vocal command that initiates a telephone routine.

5. The method according to claim 1, further comprising generating as said linguistic interpretation at least a portion of a word stored on said handheld electronic device.

6. The method according to claim 1, further comprising generating as said linguistic interpretation a word stored on said handheld electronic device.

7. The method according to claim 1, further comprising detecting another predetermined input, responsive to said detecting another predetermined input, altering said first character assignments of at least some of said input members of said subset to each correspond with said first set of letters, and terminating the displaying of said representation.

8. The method according to claim 1, wherein, for at least some of the input members, said first character assignment further comprises a digit, and wherein subsequent to said altering, said first character assignment still comprises said digit.

9. The method according to claim 8, further comprising detecting as at least a portion of said second input a vocal command, said vocal command being one of said digits of said first characters assignments.

10. The method according to claim 1, further comprising detecting as said second input a number of actuations of a number of input members in said subset.

11. A handheld electronic device, comprising:
   a keyboard having a plurality of input members, a subset of said plurality of input members each having a first character assignment comprising a first set of letters;
   a display;
   a processor apparatus comprising a processor and a memory in electronic communication with one another, said processor apparatus having stored therein a number of routines, including a disambiguation routine, which, when executed on said processor, cause said handheld electronic device to perform operations comprising:
   detecting a predetermined first input;
   responsive to said detecting a predetermined first input, displaying a representation of a keypad comprising a plurality of keys wherein at least some of the keys each have a second character assignment comprising a second set of letters, wherein the at least some of said keys have a spatial position that corresponds to a spatial position of an input member in said subset;
   altering said first character assignments of at least some of said input members of said subset to each correspond with said second character assignment of a key having a corresponding spatial position;
   subsequent to said altering, detecting a second input;
   employing said disambiguation function to generate a linguistic interpretation of said second input; and
   outputting said linguistic interpretation.

12. The handheld electronic device according to claim 11, wherein said representation is a representation of a touchtone telephone keypad.

13. The handheld electronic device according to claim 11, wherein said first input is an input that initiates a telephone routine.

14. The handheld electronic device according to claim 11, wherein said linguistic interpretation is at least a portion of a word stored on said handheld electronic device.

15. The handheld electronic device according to claim 11, wherein said linguistic interpretation is a word stored on said handheld electronic device.

16. The handheld electronic device according to claim 11, wherein said number of routines cause said handheld electronic device to perform operations further comprising:
   detecting another predetermined input; and responsive to said detecting another predetermined input, altering said first character assignments of at least some of said input members of said subset to each correspond with said first set of letters, and terminating the displaying of said representation.

17. The handheld electronic device according to claim 11, wherein, for at least some of said input members, said first character assignment further comprises a digit, and wherein subsequent to said altering, said first character assignment still comprises said digit.

18. The handheld electronic device according to claim 17, wherein said number of routines cause said handheld electronic device to perform operations further comprising:
   detecting as at least a portion of said second input a vocal command, said vocal command being one of said digits of said first characters assignments.

19. The handheld electronic device according to claim 11, wherein said second input is a number of actuations of a number of input members in said subset.

20. The handheld electronic device according to claim 11, wherein said second input is a vocal command that initiates a telephone routine.

* * * * *

UNITED STATES PATENT AND TRADEMARK OFFICE
CERTIFICATE OF CORRECTION

PATENT NO. : 7,642,934 B2 Page 1 of 1
APPLICATION NO. : 11/558621
DATED : January 5, 2010
INVENTOR(S) : Sherryl Lee Lorraine Scott It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 651 days.

Signed and Sealed this

Sixteenth Day of November, 2010

David J. Kappos
*Director of the United States Patent and Trademark Office*